United States Patent [19]

Hall et al.

[11] 4,244,623

[45] Jan. 13, 1981

[54] MULTI-POSITION ARMREST

[75] Inventors: Garth O. Hall; Harvey N. Tengler, both of New Berlin; Neal C. Eriksson, Franklin, all of Wis.

[73] Assignee: UOP Inc., Des Plaines, Ill.

[21] Appl. No.: 37,209

[22] Filed: May 8, 1979

[51] Int. Cl.³ ............................................. A47C 7/54
[52] U.S. Cl. .................................. 297/417; 297/162; 297/411
[58] Field of Search ............... 297/115, 411, 417, 116, 297/117, 330, 412, 162

[56] References Cited

U.S. PATENT DOCUMENTS

| 3,506,303 | 4/1970 | Smittle et al. | 297/162 |
| 3,547,488 | 12/1970 | Barnes | 297/162 |
| 3,598,442 | 8/1971 | Miller | 297/162 |
| 4,085,967 | 4/1978 | Spencer | 297/417 X |
| 4,097,088 | 6/1978 | Meiller | 297/417 |
| 4,165,901 | 8/1979 | Swenson et al. | 297/417 |
| 4,176,878 | 12/1979 | Koutsky | 297/411 |

FOREIGN PATENT DOCUMENTS 562067 5/1957 Italy ........................................ 297/411
2334612 1/1975 Fed. Rep. of Germany ........... 297/411

Primary Examiner—James T. McCall
Attorney, Agent, or Firm—James R. Hoatson, Jr.; Barry L. Clark; William H. Page, II

[57] ABSTRACT

Multi-position armrest for a vehicle seat incorporates a parallelogram linkage which permits the armrest to be raised or lowered through a series of parallel positions and locked in any one against downward movement. A ratchet and pawl arrangement permits the armrest to be tilted while in various fixed positions of the linkage, or, simultaneously as the linkage is moved. Movements of the arm or linkage in a lowering direction are controlled by a pair of manually operated buttons which operate separate, spaced apart pawls which engage different teeth on a single ratchet member. The buttons are not required for upward movement. The armrest can function as such or can be lowered to be flush with the seat so as to extend the seat width. It can also be tilted downwardly to a hip supporting position or upwardly to a vertical storage position. Various cam and stop arrangements restrict movements of the armrest outside a preferred range.

13 Claims, 14 Drawing Figures

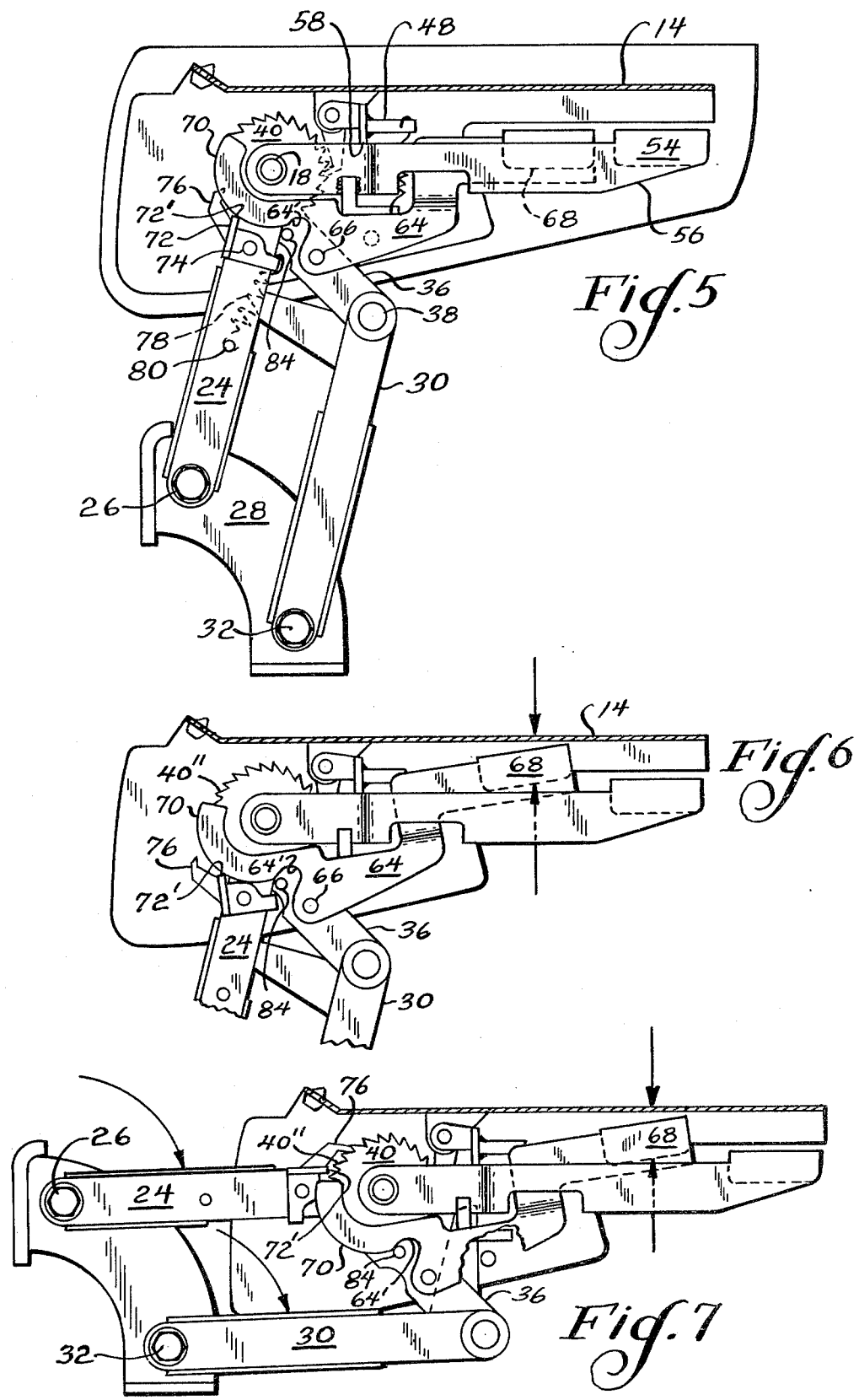

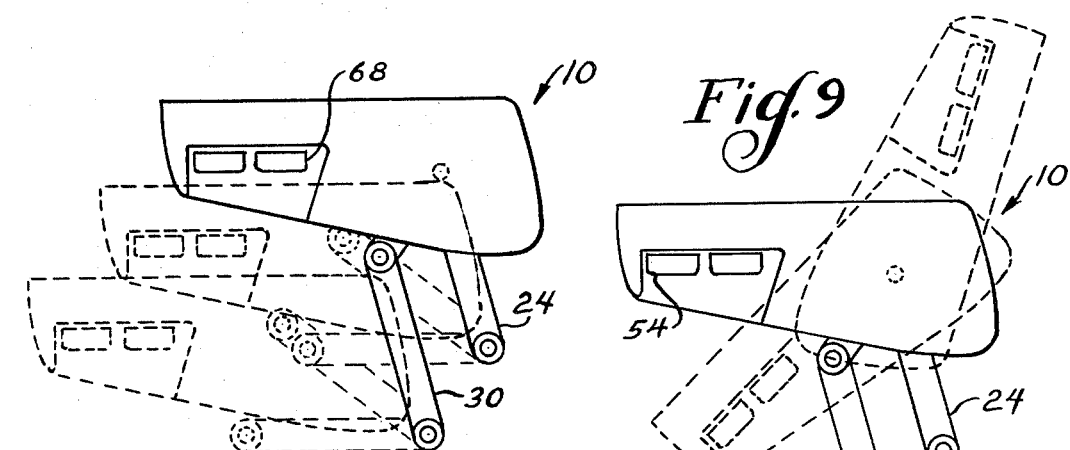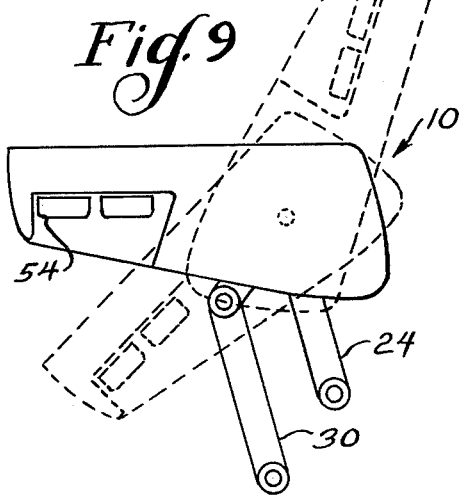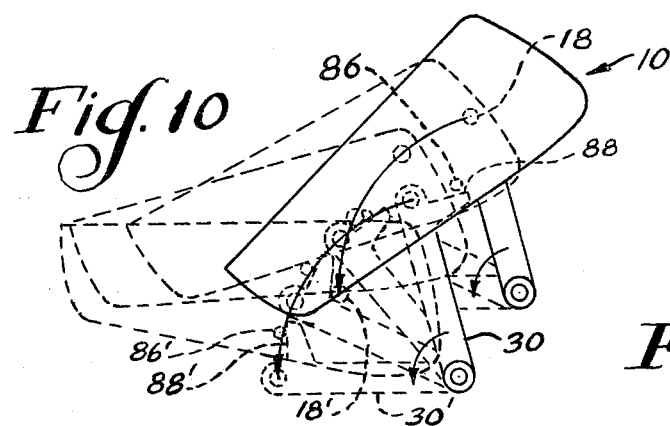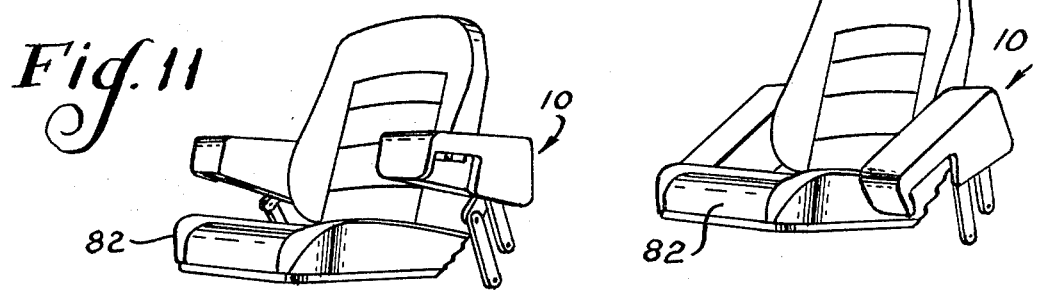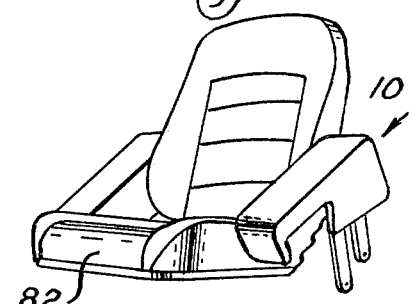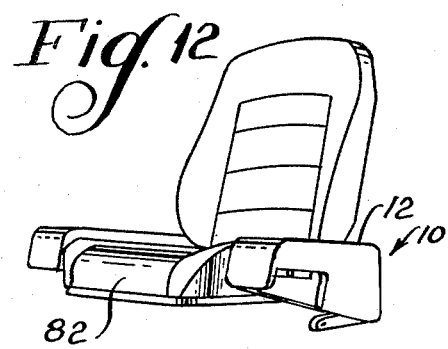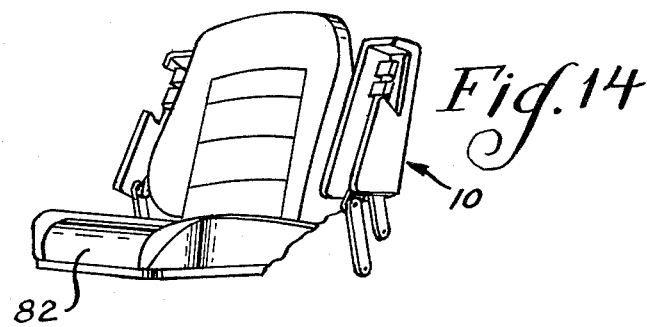

4,244,623

MULTI-POSITION ARMREST

BACKGROUND OF THE INVENTION

The invention relates to armrests for vehicle seats and particularly to an armrest which can be moved to varying positions of adjustment, including one wherein it constitutes an extension of the seat bottom. Meiller U.S. Pat. No. 4,097,088 is one example of such an armrest. Another example is a tractor seat recently sold by John Deere Company which has an armrest pivotably attached at two points to two links carried by the seat frame so as to permit movement of the armrest to several generally parallel positions.

An armrest is a comfort feature that appeals to many purchasers of vehicle seats. To facilitate access to the seat during entry and exit of the occupant, the typical armrest is usually pivoted to the side of the seat back so it can be moved about a fixed axis between a vertical storage position and a generally horizontal use position. The use position can sometimes be pivotally adjusted slightly relative to horizontal by adjustable stop members to suit occupant preferences or to help accommodate occupant height differences. Certain vehicles, such as farm implements, are typically operated by one person but are sometimes used to transport a helper to the site of the day's work. The seat widening arms discussed above permit more than one person to occupy the seat in such a transport situation and then the arms can be raised to their use position to provide comfort to the operator. In the case of the aforementioned tractor seat, the armrest cannot be retracted to a vertical non-use position and thus, the seat occupant must either maneuver around the rather large armrest to enter or exit the vehicle or must slide himself over the additional width of the armrest, a rather awkward procedure. In some situations, the occupant does not wish to be hindered by armrests when he must be frequently turning to check operations going on behind him but would appreciate the side restraint provided by the hip support type seats often used in off-the-road equipment. Such equipment is often steered by levers located below the sides of the seats and the seats have short angled armrest portions on the top of the fixed hip supports.

SUMMARY OF THE INVENTION

It is among the objects of the present invention to provide an armrest for a vehicle seat which can provide not only a composite of all the adjustment positions previously achieved by a number of individual prior art constructions, but a substantially greater number of positions.

The foregoing objects are attained by the armrest structure of the present invention which, in its preferred embodiment, incorporates a parallelogram linkage which includes two parallel links pivoted to the seat frame. The linkage permits the armrest to move through a wide range of parallel positions so that occupants of varying height can select the exact armrest height they prefer or can position the armrest flush with the edge of the seat to extend the width of its bottom cushion. The ends of the two parallel links which are remote from the seat frame are connected by a pivoted connecting link which has a circular, peripherally toothed ratchet type gear portion in surrounding relation to its pivotal connection point to the uppermost one of the pair of links. A pair of pawls, controlled by a pair of resiliently biased finger activated buttons engage the toothed ratchet to control armrest rotation or linkage movement. The armrest member can pivot about said pivotal connection point to any one of a number of selected angular positions provided by the toothed ratchet, and, once positioned, will remain at the selected angle, or parallel thereto, even though the pair of links are rotated. However, a stop member is provided on the arm to prevent the forward end of the armrest from being moved below the level of the cushion and to cause the armrest to move into a horizontal position, aligned with the cushion, if the links are moved to their lowest position while the armrest is tilted downwardly. To prevent the forward end of the armrest from being higher than the rearward end when the armrest is in its lowest position, a cam arrangement is provided to prevent actuation of the linkage lowering mechanism until the armrest has been tilted downwardly to at least a horizontal position.

BRIEF DESCRIPTION OF THE DRAWINGS

FIG. 5 is a view similar to FIG. 1 but one which illustrates the inner side of the left arm;

FIG. 6 is a fragmentary view showing the structure of FIG. 5 in the position it assumes when the height adjustment button is actuated;

FIG. 7 is a view similar to FIG. 6 but illustrates the cam means which prevents further downward movement of the parallelogram height adjustment linkage;

FIG. 8 is a side view illustrating various parallel positions which may be assumed by the armrest by pivoting the parallelogram linkage;

FIG. 9 is a side view illustrating several representative positions to which the armrest may be tilted while in a given position of the parallelogram linkage;

FIG. 10 is a side view illustrating the manner in which the armrest is automatically tilted to a horizontal position when an attempt is made to lower the parallelogram linkage with the arm in a downwardly tilted position; and FIGS. 11-14 are perspective views showing the relationship between the improved armrest and a seat in four of the many possible positions.

DESCRIPTION OF THE PREFERRED EMBODIMENT

Figure 1:
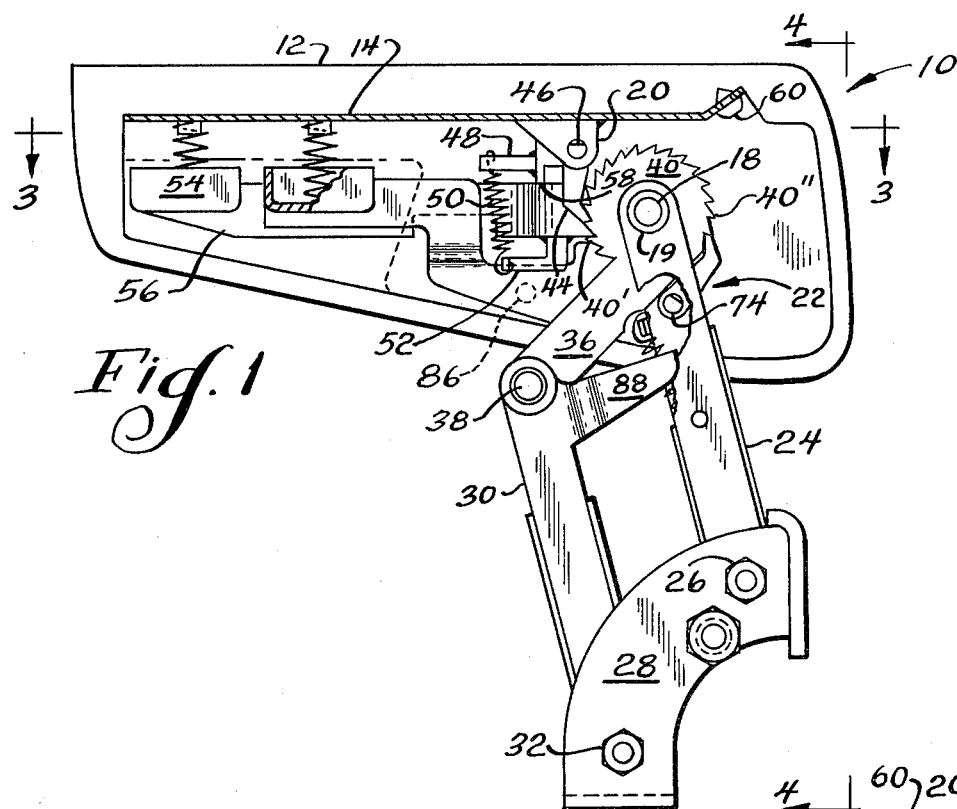
FIG. 1 is a partially broken away outer side view showing the internal structure of a left side armrest.
Figure 2:
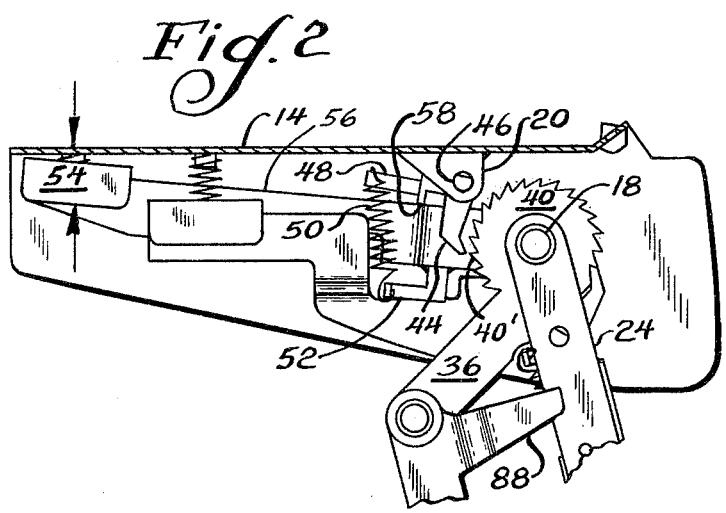
FIG. 2 is a fragmentary view showing the structure of FIG. 1 in the position it assumes when the tilting adjustment button is actuated.

In FIG. 1 the improved armrest assembly indicated generally at 10 is shown as being covered with a cushioned cover portion 12 overlying a generally channel shaped sheet metal frame portion 14. A pivot shaft 18 is mounted through the walls of the channel section 14 and retained by retaining rings 19. The pivot shaft 18 cooperates with a support bracket 20, which may be welded to the upper inside surface of the channel 14 or struck out of the material of the frame, to mount and lock the frame member 14 relative to the adjustment mechanism indicated generally at 22. The shaft 18 is mounted at the outer end of an upper link member 24 whose lower end is pivotally mounted by a mounting bolt 26 to a seat frame portion 28. A lower link member 30 is similarly mounted to the seat frame 28 by a mounting bolt 32. The links 24, 30 are parallel and their outer ends are pivotally connected to a connecting link member 36 which is attached to link 30 by pivot pin 38 and to link 24 by the aforementioned pivot shaft 18. The links 24, 30 and 28, 36 define a parallelogram. The upper end of the connecting link 36 is quite large and includes a toothed ratchet gear portion 40 having ratchet teeth 40' on its forward edge and ratchet teeth 40" on its rearward edge. An upper pawl 44 is used to lock the rotational adjustment position of the armrest relative to the pivot shaft 18. The pawl 44 is fixedly mounted on a pivot shaft 46 supported by the support bracket 20. Also fixedly mounted on the pivot shaft 46 for simultaneous movement with the pawl 44 is a lever 48 to which the upper end of a tension spring 50 is attached. The lower end of spring 50 is attached to a bracket 52. The purpose of the spring 50 is to resiliently bias the pawl 44 into engagement with the ratchet teeth 40' to prevent downward movement of the armrest while permitting the pawl to ratchet over the teeth when the forward end of the armrest is lifted. To tilt the armrest downwardly it is necessary to depress a button 54 which is mounted at the forward end of a tilt lever 56. When the button 54 is depressed, as shown in FIG. 2, a portion of the tilt lever 56 which is always in engagement with a cam portion 58 on the lever 48 will be raised so as to lift the lever 48 and simultaneously pivot the pawl 44 out of engagement with the ratchet teeth 40'. In this mode the arm can be raised or lowered freely with the upper limit being the position in which a stop pad 60 carried by frame 14 engages the rear surface of arm 24.

FIGS. 5–7 show the opposite side of the armrest shown in FIGS. 1 and 2 and illustrate the mechanism for raising and lowering the arm as compared to the tilting feature illustrated in FIGS. 1 and 2. An elongated height adjustment lever 64 is pivoted to the frame 14 by a pivot pin 66. The forward end of the lever 64 includes a height adjustment button 68 which is adapted to be squeezed upwardly as shown in FIG. 6. Since the lever 64 is pivoted, upward movement of the button 68 will cause a downward movement of a curved cam portion 70 of the lever. A cam follower surface 72' on a cam bracket 72 is resiliently urged toward the lever cam portion 70. The cam bracket 72 is keyed to a pivot shaft 74 mounted on upper link 24 to which a height adjustment pawl 76 is also keyed. A spring 78 is tensioned between anchor pin 80 on link 24 and the end of the bracket 72 which is on the opposite side of the pivot shaft 74 from the cam surface 72'. The spring causes the pawl 76 to be normally in engagement with the ratchet teeth 40" which are angled to resist downward movement of the arm. However, when button 68 is squeezed upwardly to its FIG. 6 position, the downward pivoting movement of cam surface 70 will push the cam surface 72' downwardly, causing the pawl 76 which is attached to it to disengage from teeth 40". While the pawl 76 is disengaged, the entire arm is free to be moved downwardly since there are no restraints on any portion of the parallelogram linkage consisting of links 24, 30, 36 and frame portion 28. When the arm reaches its FIG. 7 position, which is the position where the top portion 12 of the armrest is flush with the seat cushion 82 (FIG. 12), the cam follower surface 72' falls off the cam surface 70. This causes the pawl 76 to engage the teeth 40" and lock the linkage against further downward movement despite the actuation of button 68. However, since the pawl 76 is held against the ratchet teeth 40" by the spring 78, the linkage and arm can be lifted to their FIG. 5 position without squeezing the button 68 since the pawl 76 will merely ratchet over the angled teeth 40".

The cam surface 70 also prevents the armrest assembly from being lowered when the front end of the arm is tilted upwardly to any extent. The lever 64 (FIGS. 5–7) includes a notched portion 64' which defines the end of cam surface 70. When the armrest is horizontal, as shown, the notched portion 64' provides clearance around a stop pin fixed to the connecting link 36 and permits the lever 64 to be pivoted outwardly sufficiently to release the pawl 76 as shown in FIG. 6. However, one can imagine from viewing FIG. 5, that if the arm was tilted up, the cam surface 70 which moves with it would contact pin 84 as soon as lever 64 was even slightly pivoted by depressing button 68 and release of pawl 76 would be impossible. This feature prevents the arm from being positioned in what would be an uncomfortable position with its rear end flush with the seat cushion while its front end is raised.

Figure 3:
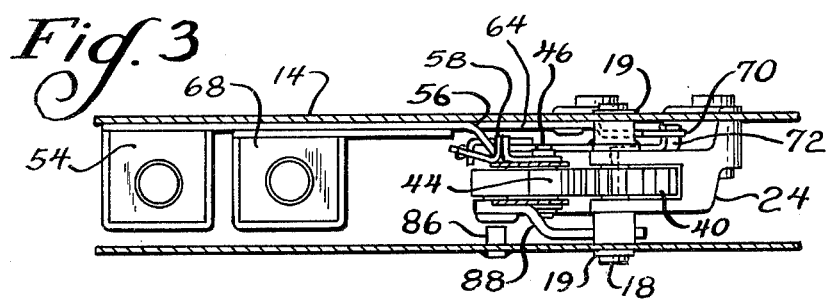
FIG. 3 is a top view taken on line 3—3 of FIG. 1.
Figure 4:
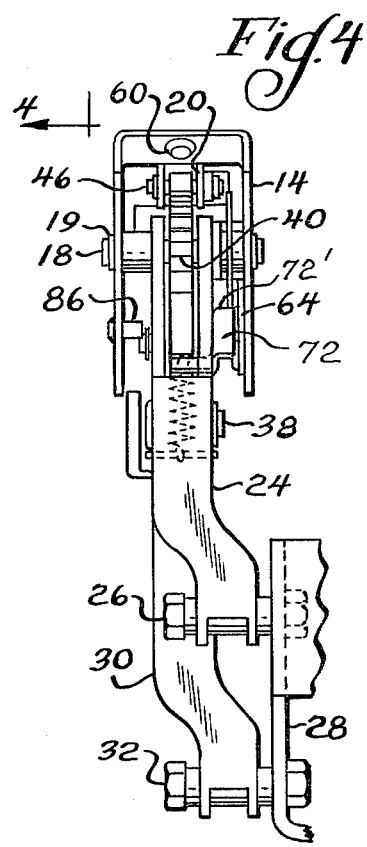
FIG. 4 is an end view taken on line 4—4 of FIG. 1.

It would appear from FIG. 7 that if the front end of the arm is tilted downwardly as the arm is lowered that the cam surface 70 will not release the pawl 76 until links 24, 30 are lower than their FIG. 7 position. However, such a situation is prevented by a pin 86 (FIGS. 1 and 3) which is mounted in frame 14 so that it will be engaged by link extension portion 88. Thus, a downwardly tilted arm will have its forward end automatically lifted to a horizontal position as link 30 is lowered to its FIG. 7 position since the portion 88 will be swept into contact with pin 86. The action which takes place is clearly illustrated in FIG. 10 where it can be seen that the extension portion 88 on link 30 will first engage pin 86 when the assembly 10 is in its solid line position and the engagement will continue as link 30 is lowered to its dotted horizontal position 30'. In the latter position, it can be seen that the pin 86' has been moved considerably by extension 88' to ratchet and lift the arm about axis 18 as the axis is moved to its lowest position 18'.

FIG. 8 illustrates the range of parallel positions which the assembly 10 can assume by squeezing the button 68 upwardly to release the locking of the parallelogram linkage which includes links 24 and 30. The lowest dotted line position is the one illustrated in FIG. 12 where the armrest serves as an extension of the seat cushion 82. The upper solid line position corresponds to the FIG. 11 armrest position and the center dotted line position corresponds to one of several intermediate armrest positions which seat occupants of varying heights might find comfortable.

FIG. 9 illustrates the range of tilt positions which the assembly 10 can assume by squeezing the button 54 upwardly without moving the links 24, 30. In the upper dotted position, the arm assembly 10 is in the generally vertical storage position of FIG. 14 where full access to the seat 82 is greatly facilitated. The solid line position corresponds to the FIG. 11 armrest position and the lower dotted line position corresponds to the FIG. 13 position where the arms are tilted down in their hip support position where they form comfortable armrests for an occupant who is operating lever type controls (not shown) at the sides of the seat.

As will be readily evident from the preceding description, our improved armrest can be raised or tilted upwardly by merely lifting it while it can be quickly lowered or tilted downward, by merely squeezing one or the other of two buttons. By providing a ratchet gear 40 with teeth position at about 15° intervals the armrest assembly 10 can provide a very large number of adjustment positions. For example, with eleven ratchet teeth 40' at a 15° pitch, the arm can be tilted to 11 angles of tilt from about 45° below horizontal to about 105° above horizontal. Similarly, six ratchet teeth 40" provide six parallel adjustment positions, three of which are illustrated in FIG. 8.

We claim as our invention:

1. A multi-position armrest assembly for at least one side of a vehicle seat comprising a seat frame, an armrest, and armrest mounting linkage means supported by said seat frame for moving said armrest and locking it against downward movement relative to said seat frame in a plurality of positions including at least: a first seat width extending position where its top surface is coplanar with and immediately adjacent to a seat bottom cushion mounted on said seat frame; a second armrest position where it is positioned above and generally parallel to said first position; a third hip support position where its rearward end is raised above the level of the seat bottom cushion and above its forward end; and a fourth storage position where it is arranged generally vertically adjacent a seatback cushion mounted on said seat frame.

2. The assembly of claim 1 wherein said linkage comprises a parallelogram which includes a pair of parallel links which are mounted at one of their ends to said seat frame and which have a connecting link pivotally joined to their other ends, said armrest being mounted for pivotal movement about a single point on one of said links and said parallel links each being mounted for pivotal movement on said seat frame.

3. The assembly of claim 2 wherein said single point is the axis on which said connecting link is pivotally joined to one of said pair of parallel links.

4. The assembly of claim 3 wherein said one of said pair of parallel links is mounted to said seat frame at a location which is higher and closer to the rear of the seat than the other of said pair of links.

5. The assembly of claim 4 wherein said connecting link has an enlarged, peripherally toothed portion at the end thereof which is pivoted to said one of said parallel links.

6. The assembly of claim 5 wherein a first pawl member is mounted on one of said links which have their common axis at said single point, said first pawl member being normally biased into engagement with a selected one of a first plurality of ratchet teeth on said toothed portion for selectively locking said parallelogram linkage in a selected vertical position, and a first manually operated means mounted on said armrest for releasing said first pawl from said engagement so that said parallelogram linkage may be moved to a position where another of said first plurality of ratchet teeth can be engaged by said first pawl.

7. The assembly of claim 2 wherein said one of said links having said single point includes an enlarged, peripherally toothed portion surrounding said single point and said armrest has a frame on which a pawl member is pivotally mounted for engagement with a selected one of a plurality of ratchet teeth on said toothed portion for locking said armrest in a selected position of angular rotation about said single point.

8. The assembly of claim 7 wherein said pawl member is resiliently biased into contact with said toothed portion, said pawl member being movable out of contact with said toothed portion by a manually operated means mounted on said armrest.

9. The assembly of claim 6 wherein said armrest has a frame on which a second pawl member is pivotally mounted for engagement with a selected one of a second plurality of ratchet teeth which are circumferentially spaced from said first plurality of ratchet teeth, said second pawl member being movable out of contact with said ratchet teeth by a second manually operated means mounted on said armrest.

10. The assembly of claim 9 wherein said first and second manually operated means comprise levers which are pivoted to the frame of the armrest and include manually depressible buttons.

11. The assembly of claim 9 wherein said pawls are each resiliently urged into contact with a selected ratchet tooth for locking said armrest against downward movement while being free to ratchet over said ratchet teeth to permit upward movement.

12. The assembly of claim 10 wherein the lever which operates said first pawl member includes a cam portion which engages a cam follower portion attached to said first pawl member, said first pawl member only being releasable by said lever when said cam follower portion contacts said cam portion and said cam portion having a limited extent which limits the number of ratchet teeth which said first pawl may engage to a number corresponding to a desired range of vertical movement of said parallelogram linkage.

13. The assembly of claim 11 wherein one of the links in said parallelogram linkage has a portion thereon which is adapted to engage a projection on the frame of the armrest to cause the armrest to be automatically pivoted to a generally horizontal position if the armrest is in a downwardly tilted position when the parallelogram linkage is lowered to its lowest position.

* * * * *